United States Patent [19]

Futagi

[11] Patent Number: 5,774,506
[45] Date of Patent: Jun. 30, 1998

[54] DATA RECEIVING APPARATUS

[75] Inventor: Sadaki Futagi, Sagamihara, Japan

[73] Assignee: Matsushita Electric Industrial Co., Ltd., Osaka, Japan

[21] Appl. No.: 787,710

[22] Filed: Jan. 24, 1997

[30] Foreign Application Priority Data

Feb. 9, 1996 [JP] Japan .................................. 8-046840

[51] Int. Cl.$^6$ ..................................................... H04B 1/10
[52] U.S. Cl. .......................................... 375/350; 455/296
[58] Field of Search ...................................... 375/346, 350, 375/232, 235; 364/724.01, 574; 455/296, 307

[56] References Cited

U.S. PATENT DOCUMENTS 5,263,018  11/1993  Christopher ............................. 375/235
5,648,989   7/1997  Ko .......................................... 375/232

FOREIGN PATENT DOCUMENTS 7321865  12/1995  Japan .

*Primary Examiner*—Temesghen Ghebretinsae
*Attorney, Agent, or Firm*—Pollock, Vande Sande & Priddy

[57] ABSTRACT

A data receiving apparatus is disclosed, which comprises: a receiving circuit (51) for receiving a transmission signal including a channel of quadrature signals and generating an IF signal (1) from the received transmission signal; a BPF for extracting the channel of quadrature components from the IF signal; a quadrature detection circuit (4) for effecting a quadrature-detection to the IF signal from the BPF and generating quadrature signals; a digital root nyquist filter (6) for effecting digital-root-nyquist-filtering to the quadrature signals from the quadrature detection circuit with a coefficient; and a coefficient prediction circuit (8) responsive to the quadrature signals from the digital root nyquist filter for predicting the coefficient and supplying the coefficient to the digital root nyquist filter. A memory circuit comprising EEPROM may be provided. Prediction may be done in response to a manual operation or detecting a deterioration in the quality of the output quadrature signals. The coefficient prediction circuit may comprise a real number type FIR filter or complex number of FIR filter and subtractors for comparing with a reference signal.

10 Claims, 5 Drawing Sheets

DATA RECEIVING APPARATUS

BACKGROUND OF THE INVENTION

1. Field of the Invention

This invention relates to a data receiving apparatus.

2. Description of the Prior Art

A data receiving apparatus comprising a receiving portion for receiving a radio wave, a quadrature detection circuit, and a digital root nyquist filter is known. FIG. 8 is a block diagram of such a prior art data receiving apparatus. An input intermediate frequency signal 11 is supplied to a bandpass filter 12 for extracting a channel of signal, a quadrature detection circuit 14 for detecting quadrature signals 15a and 15b, and a digital root nyquist filter 16 for effecting digital-root-nyquist-filtering to the quadrature signals 15a and 15b and outputting quadrature intermediate frequency signals 17a and 17b.

In this prior art data receiving apparatus, the bandpass filter 12 has a narrow band characteristic to suppress an interference with adjacent channels. Accordingly, the bandpass filter 12 has the characteristic near that of the digital root nyquist filter 16. Then, there is a problem that there is an interference between symbols in the I and Q signals 17a and 17b after the digital-root-nyquist-filtering processing.

SUMMARY OF THE INVENTION

The aim of the present invention is to provide an improved data receiving apparatus.

According to the present invention, a data receiving apparatus is provided, which comprises: a receiving circuit for receiving a transmission signal including a channel of quadrature signals and generating an intermediate frequency signal from the received transmission signal; a bandpass filter for extracting the channel of quadrature components from the intermediate frequency signal; a quadrature detection circuit for effecting a quadrature-detection to the intermediate frequency signal from the bandpass filter and generating quadrature signals; a digital root nyquist filter for effecting digital-root-nyquist-filtering to the quadrature signals from the quadrature detection circuit with a coefficient; and a coefficient prediction circuit responsive to the quadrature signals from the digital root nyquist filter for predicting the coefficient and supplying the coefficient to the digital root nyquist filter.

The data receiving apparatus further comprises a memory circuit for storing the coefficient from the coefficient prediction portion, reading the stored coefficient, and supplying the read coefficient to the digital root nyquist filter. The memory circuit may comprise an EEPROM The data receiving apparatus may further comprise an input circuit for receiving an operation and operating the coefficient prediction circuit to predict the coefficient and supplying the predicted coefficient to the digital root nyquist filter.

The data receiving apparatus may further comprise an estimation circuit for estimating the quadrature signals from the digital root nyquist filter and operating the coefficient prediction circuit to predict the coefficient and supplying the predicted coefficient to the digital root nyquist filter when a quality of the quadrature signals from the digital root nyquist filter is less than a reference.

In the data receiving apparatus, the coefficient prediction circuit may comprise a real number type Finite Impulse Response filter for effecting real-number-type-Finite-Impulse-Response-filtering to the quadrature signals from the digital root nyquist filter and first and second subtractors for obtaining differences between filtered quadrature signals from the real number type Finite Impulse Response filter and reference quadrature signals, the real number type Finite Impulse Response filter predicting the coefficient such that the differences become small.

In the data receiving apparatus, the coefficient prediction circuit may comprise a complex number type Finite Impulse Response filter for effecting complex-number-type-Finite-Impulse-Response filtering to the quadrature signals from the digital root nyquist filter and generating a complex signal and a subtractor for obtaining a difference between an output of the complex number type Finite Impulse Response filter and a reference complex signal, the complex number type Finite Impulse Response filter predicting the coefficient such that the differences become small.

In the data receiving apparatus, the quadrature signals in the radio wave signal includes a predetermined data pattern and the coefficient prediction circuit predicts the coefficient from the predetermined data pattern.

In the data receiving apparatus, the bandpass filter has a first characteristic, the digital root nyquist filter has a second characteristic determined by the coefficient, and the prediction circuit predicts the coefficient such that the first and second characteristics satisfy a root nyquist characteristic.

According to this invention, another data receiving apparatus is provided which comprises: a receiving portion for receiving an intermediate frequency signal including a channel of quadrature signals; a bandpass filter for extracting the channel of quadrature components from the intermediate frequency signal; quadrature detection portion for effecting a quadrature-detection to the intermediate frequency signal from the bandpass filter and generating quadrature signals; a digital root nyquist filter for effecting digital-root-nyquist-filtering to the quadrature signals from the quadrature detection portion with a coefficient; and a coefficient prediction portion responsive to the quadrature signals from the digital root nyquist filter for predicting the coefficient and supplying the coefficient to the digital root nyquist filter.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

A first embodiment of this invention will be described.

Figure 1:
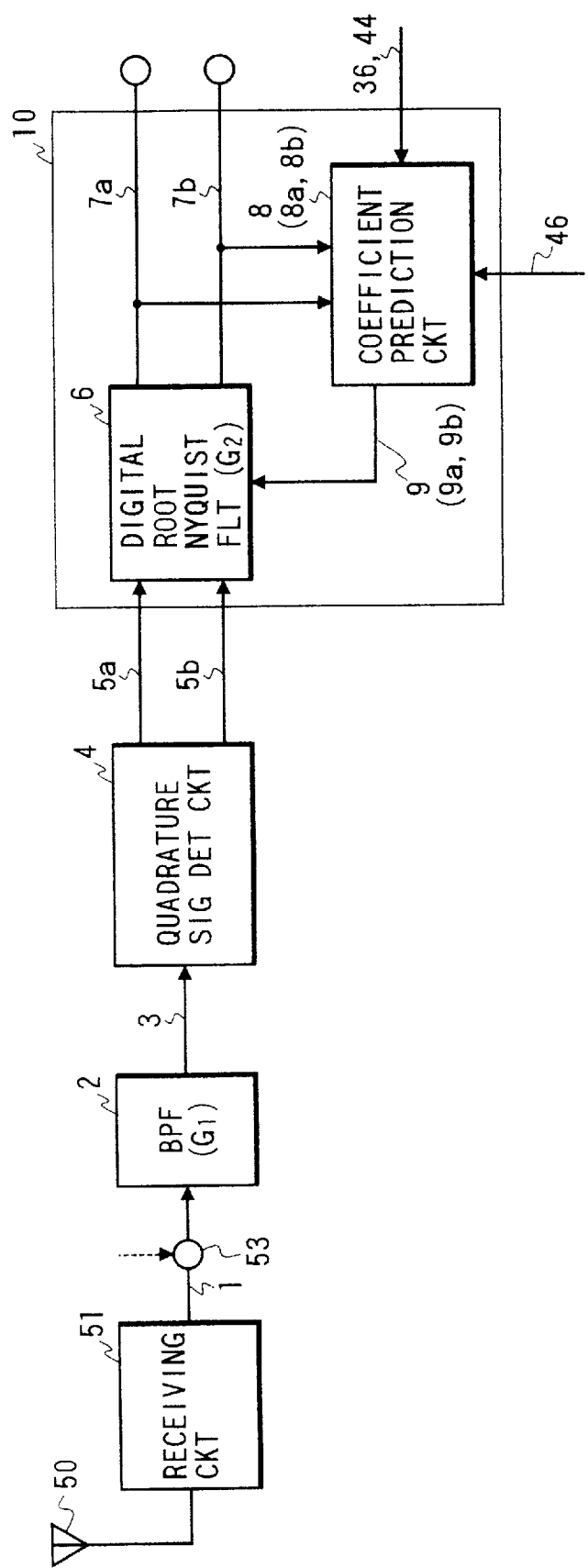
FIG. 1 is a block diagram of a data receiving apparatus of a first embodiment.

FIG. 1 is a block diagram of a data receiving apparatus of the first embodiment.

The data receiving apparatus of the first embodiment comprises: an antenna 50 for receiving a radio wave signal including a channel of quadrature signals, a receiving circuit 51 for generating an intermediate frequency signal 1 from the received radio wave signal; a bandpass filter 2 for extracting the channel of an intermediate frequency signal 3 including quadrature components from the intermediate frequency signal 1; a quadrature detection circuit 4 for effecting a quadrature detection to the intermediate frequency signal 3 from the bandpass filler 2 and generating quadrature components 5a and 5b; a digital root nyquist filter 6 for effecting digital-root-nyquist-filtering to the detected quadrature components 5a and 5b from the quadrature detection circuit 4 with a coefficient 9 to supply output quadrature signals 7a and 7b; and a coefficient prediction circuit 8 responsive to the output quadrature signals 7a and 7b from the digital root nyquist filter 6 for predicting the coefficient 9, holding the coefficient 9 in response to a memory control signal 46, and supplying the coefficient 9 to the digital root nyquist filter 6.

The antenna 50 receives the radio wave signal including a channel of quadrature signals and the receiving circuit 51 generates the intermediate frequency signal 1 from the received radio wave signal. The receiving circuit 51 may receive a transmission signal via a cable. The bandpass filter 2 extracts the channel of the intermediate frequency signal 3 including quadrature components from the intermediate frequency signal 1. The quadrature detection circuit 4 effects the quadrature detection to the intermediate frequency signal 3 from the bandpass filler 2 and generates the quadrature components 5a and 5b. The digital root nyquist filter 6 effects the digital-root-nyquist-filtering to the detected quadrature components 5a and 5b from the quadrature detection circuit 4 with the coefficient 9 to compensate a deterioration in the quadrature components 5a and 5b due to wave shape deterioration in the analog elements in the data receiving apparatus. The digital root nyquist filter 6 supplies the output quadrature signals 7a and 7b. The coefficient prediction circuit 8 responsive to the output quadrature signals 7a and 7b from the digital root nyquist filter 6 predicts the coefficient 9 such that the deterioration in the quadrature signals 5a and 5b due to the analog elements in the circuits of this data receiving apparatus is compensated. More specifically, differences between the quadrature signals (I and Q components) 7a and 7b and the I and Q components in the reference signal 36. The prediction circuit 8 holds the coefficient 9 and supplies the coefficient 9 to the digital root nyquist filter 6.

Figure 2:
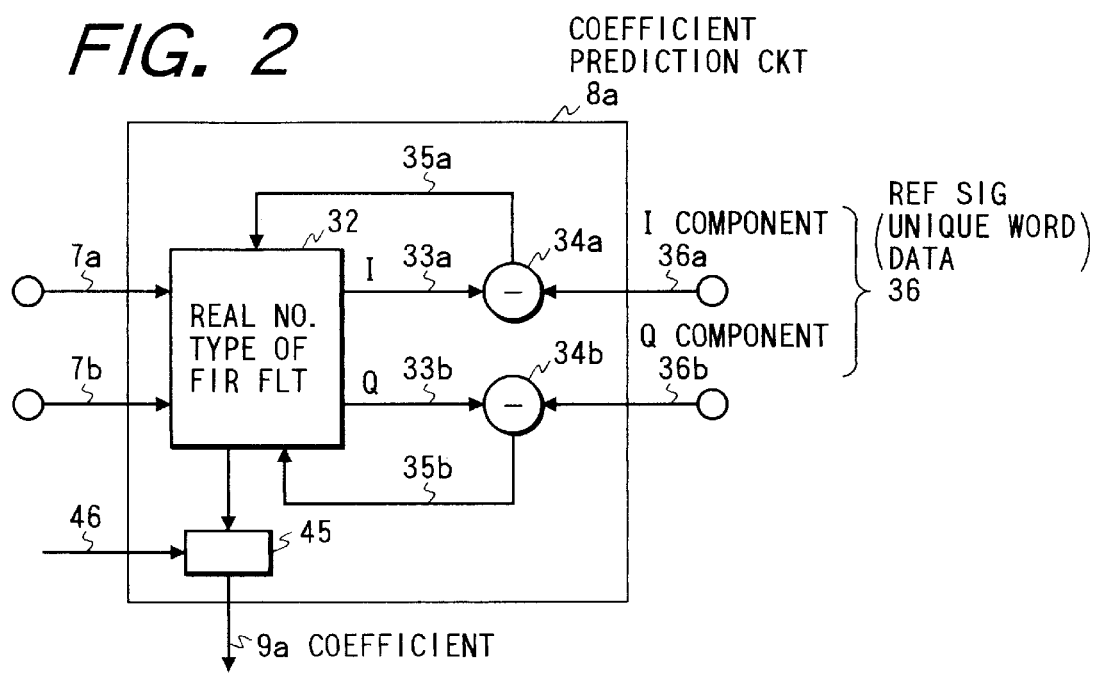
FIGS. 2 and 3 are partial block diagrams of coefficient prediction circuits of the first embodiment.
Figure 3:
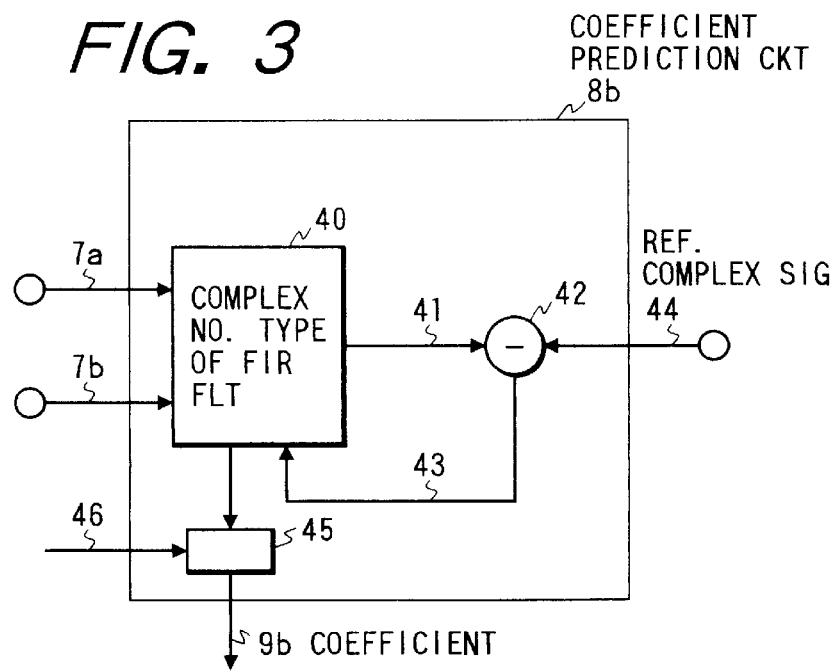

FIGS. 2 and 3 are partial block diagrams of the coefficient prediction circuits of this embodiment.

In FIG. 2, the coefficient prediction circuit 8a comprises a real number type of FIR (Finite Impulse Response) filter 32 for effecting a real number type of FIR filtering to the output quadrature signals 7a and 7b and generating filtered I and Q signals 33a and 33b, a subtractor 34a for effecting a subtraction between the filtered I signal and an I component 36a of a reference signal 36 externally supplied and supplying a difference 35a to the real number type of FIR filter 32, a subtractor 34b for effecting a subtraction between the filtered Q signal and a Q component 36b of the reference signal 36 externally supplied and supplying a difference 35b to the real number type of FIR filter 32, and a memory 45 for storing the predicted coefficient in response to the memory control signal 46.

The real number type of FIR filter 32 effects the real number type of FIR filtering to the output quadrature signals 7a and 7b and generates the filtered I and Q signals 33a and 33b. The subtractor 34a effects the subtraction between the filtered I signal 33a and the I component 36a of the reference signal 36 and supplies the difference 35a to the real number type of FIR filter 32. The subtractor 34b effects the subtraction between the filtered Q signal 33b and the Q component 36b of the reference signal 36 and supplies the difference 35b to the real number type of FIR filter 32. The real number type of FIR filter 32 predicts the coefficient 9a so as to reduce the differences 35a and 35b. The memory 45 stores the predicted coefficient in response to the memory control signal 46. The memory 45 comprises an EEPROM (Electrically erasable/programmable read-only memory).

In this embodiment, the coefficient is predicted at a last stage of a manufacturing processing of this receiving apparatus. A noise signal or a signal subjected to the phasing is inputted as an ideal signal to the antenna 50 or the bandpass filter 2 through a terminal 53 and the reference signal 36 or 44 is supplied when the coefficients are predicted. In this condition, the coefficient 9 is determined and stored in the EEPROM in response to the memory control signal 46.

In FIG. 3, the coefficient prediction circuit 8b comprises a complex number type of FIR filter 40 for effecting a complex number type of FIR filtering to the output quadrature signals 7a and 7b and generating a complex signal 41, a subtractor 34a for effecting a subtraction between the complex signal 41 and a reference complex signal 44 externally supplied and supplying a difference 43 to the complex number type of FIR filter 40, and a memory 45 for storing the predicted coefficient in response to the memory control signal 46.

The complex number type of FIR filter 40 effects the complex number type of FIR filtering to the output quadrature signals 7a and 7b and generates the complex signal 41. The subtractor 42 effects the subtraction between the complex signal 41 and the reference complex signal 44 and supplies the difference 43 to the complex number type of FIR filter 40. The complex number type of FIR filter 40 predicts the coefficient 9b so as to reduce the difference 43. The memory 45 stores the predicted coefficient in response to the memory control signal 46. The memory 45 comprises an EEPROM.

In the case of the complex number type of FIR filter 40, the coefficient 9 is predicted similarly. However, the coefficient can be determined more accurately than that in the case of the real number type of FIR filter 32.

As mentioned, according to this embodiment, the filtering by the digital root nyquist filter 6 with the predicted coefficient 9 reduces interference between symbols in I and Q components of the quadrature signals 7a and 7b. Therefore, a receiving characteristic of this data receiving apparatus is improved. Particularly, the receiving characteristics of respective data receiving apparatus can be compensated independently.

A second embodiment will be described.

Figure 4:
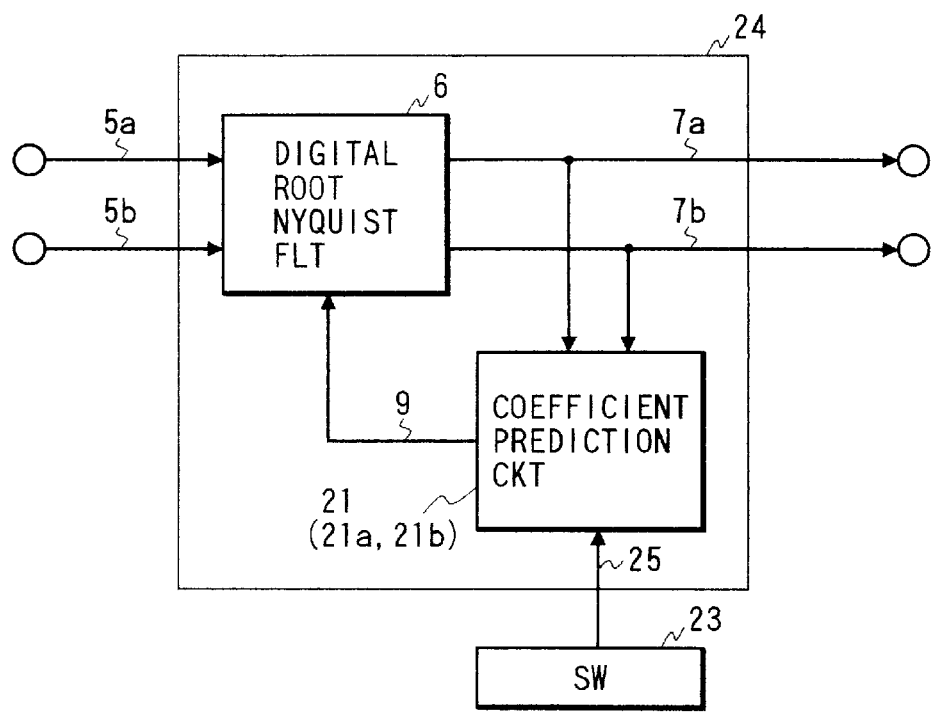
FIG. 4 is a partial block diagram of a data receiving apparatus of a second embodiment.

FIG. 4 is a partial block diagram of a data receiving apparatus of the second embodiment. The data receiving apparatus of the second embodiment has essentially the same structure as that of the first embodiment. The difference is that the coefficient prediction circuit 21 predicts the coefficient 9 in response to a manual switch 23 and the reference signal 36 or the reference signal 44 for producing the coefficient 9 is generated in the coefficient prediction circuit 21. Other structure and operation are the same as the first embodiment.

When the operator operates the switch 23, the coefficient prediction circuit 21 predicts the coefficient from the I and Q components of the output quadrature signals 7a and 7b and supplies the predicted coefficient 9 to the digital root nyquist filter 6. The reference signal 36 or 44 for producing the coefficient 9 is generated by a signal generation circuit 47 (mentioned later) in the coefficient prediction circuit 21. Other structure and operation are the same as the first embodiment.

In this embodiment, the coefficient 9 can be renewed by the operation by the operator, so that a deterioration in the receiving characteristic due to a deterioration in the analog elements developed as time passes can be compensated.

A third embodiment will be described.

Figure 5:
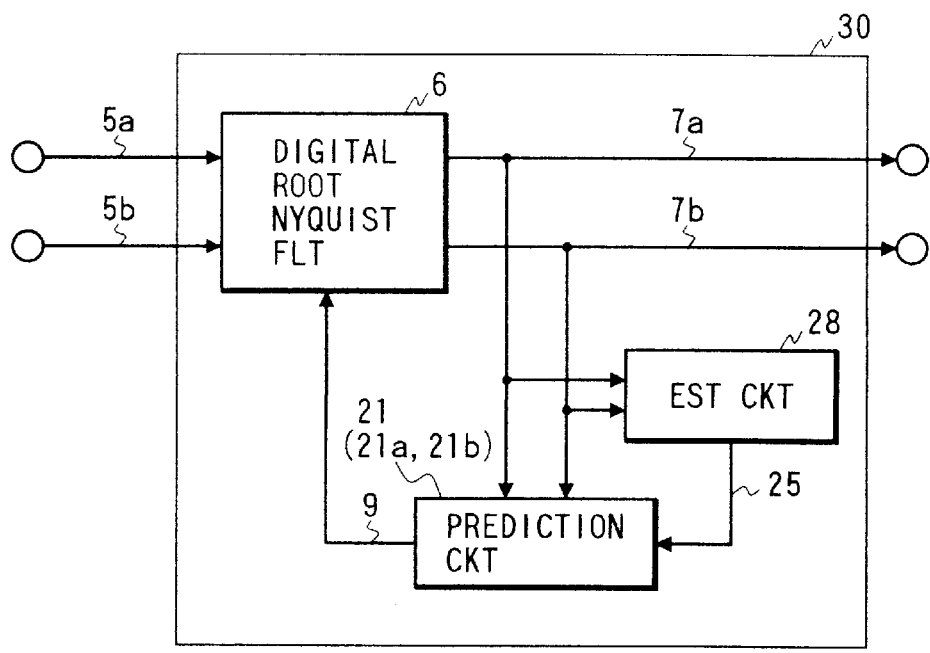
FIG. 5 is a partial block diagram of a data receiving apparatus of a third embodiment.

FIG. 5 is a partial block diagram of a data receiving apparatus of the third embodiment. The data receiving apparatus of the third embodiment has essentially the same structure as that of the second embodiment. The difference is that an estimation circuit 28 response to the quadrature signals 7a and 7b is further provided. The estimation circuit 28 estimates the quadrature signals from the digital root nyquist filter 6 and operates the coefficient prediction circuit 21 to predict the coefficient 9 and supplies the predicted coefficient 9 to the digital root nyquist filter 6 when a quality of the quadrature signals from the digital root nyquist filter 6 is less than a reference. Other structure and operation are the same as the first embodiment.

In this embodiment, the coefficient 9 can be renewed automatically by detecting the deterioration in the quadrature signals 7a and 7b, so that a deterioration in the receiving characteristic due to a deterioration in the analog elements developed as time passes can be compensated automatically.

The coefficient prediction circuit 21 used in the second and third embodiments will be described.

Figure 6:
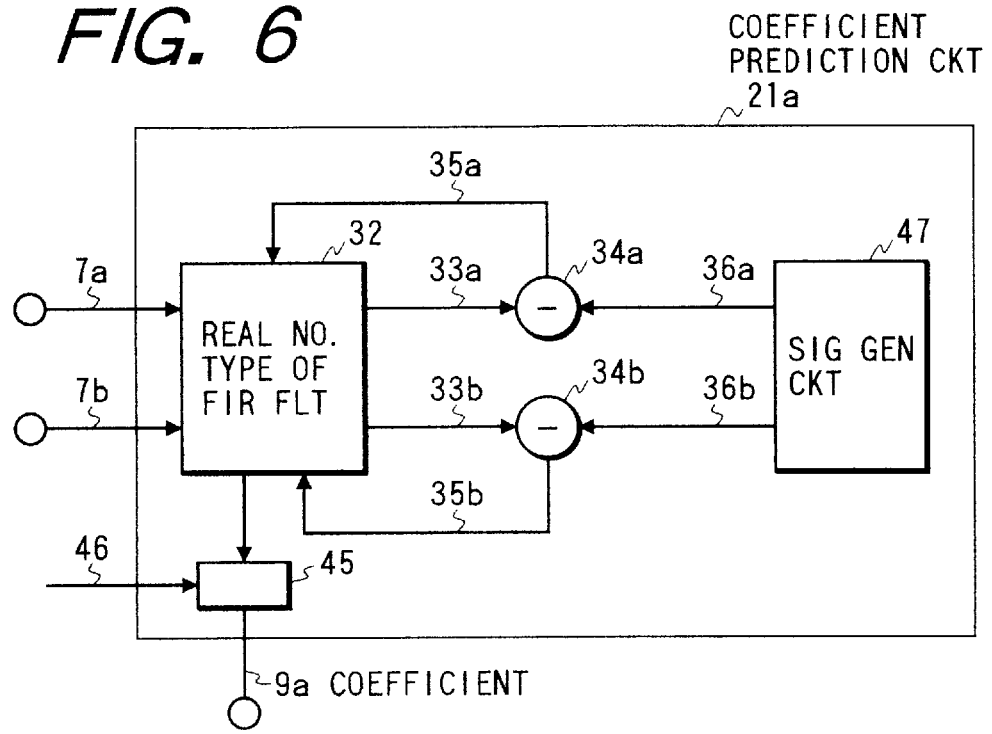
FIGS. 6 and 7 are partial block diagrams of the coefficient prediction circuits of the second and third embodiments.
Figure 7:
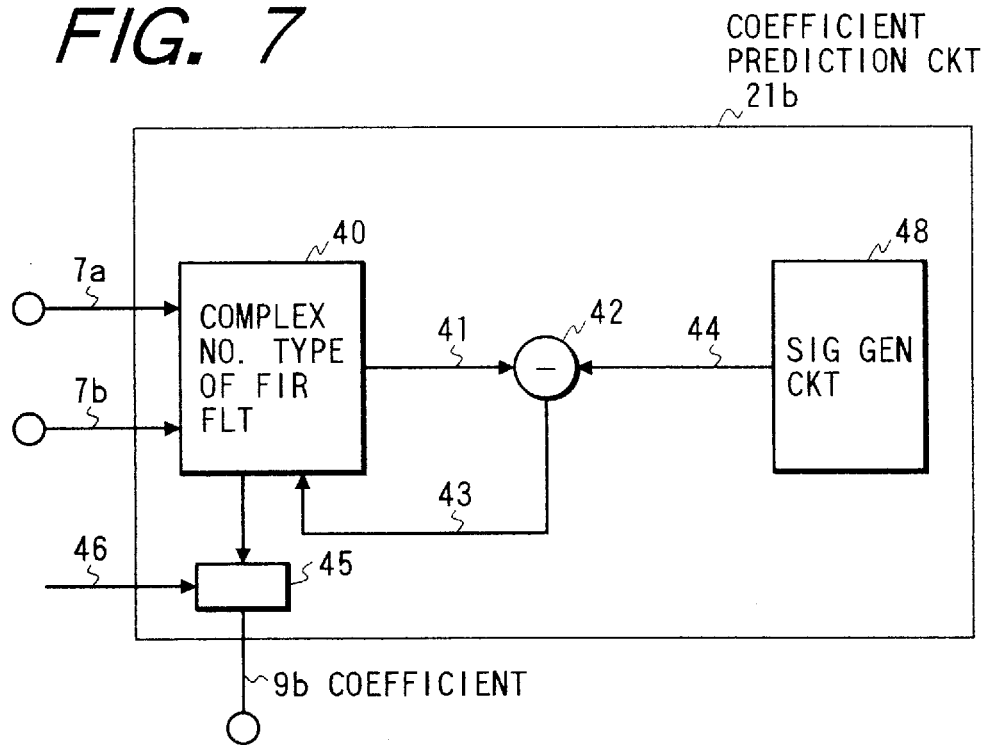
Figure 8:
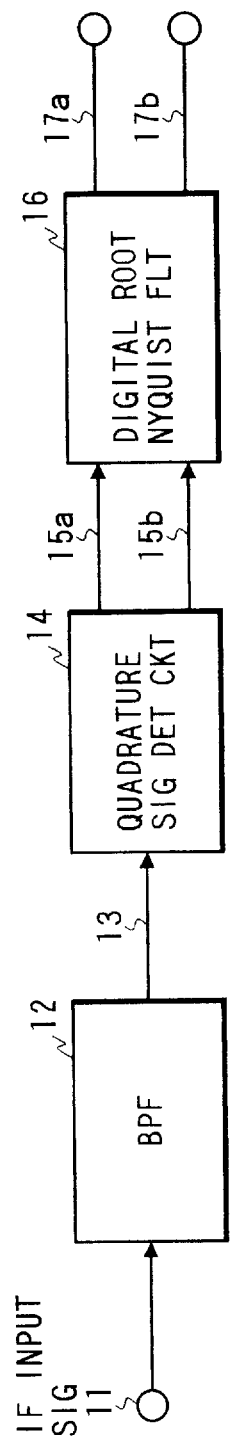
FIG. 8 is a block diagram of a prior art data receiving apparatus.

FIGS. 6 and 7 are partial block diagrams of the coefficient prediction circuits 21 of the second and third embodiments. Each of the coefficient prediction circuits shown in FIGS. 6 and 7 can be used in both second and third embodiments.

In FIG. 6, the coefficient prediction circuit 21a comprises a real number type of FIR filter 32 for effecting a real number type of FIR filtering to the output quadrature signals 7a and 7b and generating filtered I and Q signals 33a and 33b, a signal generation circuit 47 for generating a reference signal 36 including an I component 36a and a Q component 36b of the reference signal 36, a subtractor 34a for effecting a subtraction between the filtered I signal 33a and the I component 36a and supplying the difference 35a to a real number type of FIR filter 32, a subtractor 34b for effecting a subtraction between the filtered Q signal 33b and a Q component 36b and supplying a difference 35b to the real number type of FIR filter 32, and a memory 45 for storing the predicted coefficient in response to the memory control signal 46.

The real number type of FIR filter 32 effects the real number type of FIR filtering to the output quadrature signals 7a and 7b and generates the filtered I and Q signals 33a and 33b. The subtractor 34a effects the subtraction between the filtered I signal 33a and the I component 36a of the reference signal and supplies the difference 35a to the real number type of FIR filter 32. The subtractor 34b effects the subtraction between the filtered Q signal 33b and the Q component 36b of the reference signal and supplies the difference 35b to the real number type of FIR filter 32. The real number type of FIR filter 32 predicts the coefficient 9a so as to reduce the difference 35. The memory 45 stores the predicted coefficient 9a in response to the memory control signal 46. The memory 45 comprises an EEPROM.

In FIG. 7, the coefficient prediction circuit 21b comprises a complex number type of FIR filter 40 for effecting a complex number type of FIR filtering to the output quadrature signals 7a and 7b and generating a complex signal 41, a signal generation circuit 48 for generating a reference complex signal 44 including a complex signal, a subtractor 42 for effecting a subtraction between the complex signal 41 and the reference complex signal 44 and supplying a difference 43 to the complex number type of FIR filter 40, and a memory 45 for storing the predicted coefficient in response to the memory control signal 46.

The complex number type of FIR filter 40 effects the complex number type of FIR filtering to the output quadrature signals 7a and 7b and generates the complex signal 41. The subtractor 42 effects the subtraction between the complex signal 41 and the reference complex signal 44 and supplies the difference 43 to the complex number type of FIR filter 40. The complex number type of FIR filter 40 predicts the coefficient 9b so as to reduce the difference 43. The memory 45 stores the predicted coefficient in response to the memory control signal 46. The memory 45 comprises an EEPROM.

In the first and second embodiments, the reference signals supplied to the coefficient prediction circuits 8a and 8b are externally supplied. However, it is also possible to internally supply these reference signals with the signal generation circuit 47 and 48 as shown in FIGS. 6 and 7.

In the first to third embodiments, the quadrature signals in the radio wave signal includes a predetermined data pattern which is subjected to phasing or further includes noise and the coefficient prediction circuit 8 or 21 predicts the coefficient from the predetermined data pattern. A unique word included in the radio wave can be used as the predetermined data pattern. The reference signals 36 and 44 also include the predetermined data patterns correspondingly. Alternatively, the intermediate frequency signal having a predetermined data pattern subjected to phasing or further including noise is supplied to the bandpass filter 2 through the terminal 53.

In the first to third embodiments, the bandpass filter 1 has a first characteristic G1 and the digital root nyquist filter 6 has a second characteristic G2 determined by the coefficient 9. The coefficient prediction circuits predict the coefficients 9 such that the first and second characteristics G1 and G2 satisfy a root nyquist characteristic.

What is claimed is:

1. A data receiving apparatus comprising:
receiving means for receiving a transmission signal including a channel of quadrature signals and generating an intermediate frequency signal from said received transmission signal;
bandpass filter means for extracting said channel of quadrature components from said intermediate frequency signal;
quadrature detection means for effecting a quadrature detection to said intermediate frequency signal from said bandpass filter means and generating quadrature signals;
a digital root nyquist filter for effecting digital-root-nyquist-filtering to said quadrature signals from said quadrature detection means with a coefficient; and
coefficient prediction means responsive to the quadrature signals from said digital root nyquist filter for predicting said coefficient and supplying said coefficient to said digital root nyquist filter.

2. A data receiving apparatus as claimed in claim 1, further comprising: a memory circuit for storing said coefficient from said coefficient prediction means, reading said stored coefficient, and supplying said read coefficient to said digital root nyquist filter.

3. A data receiving apparatus as claimed in claim 1, further comprising: input means for receiving an operation and operating said coefficient prediction means to predict said coefficient and supplying the predicted coefficient to said digital root nyquist filter.

4. A data receiving apparatus as claimed in claim 1, further comprising, estimation means for estimating the quadrature signals from said digital root nyquist filter and operating said coefficient prediction means to predict said coefficient and supplying the predicted coefficient to said digital root nyquist filter when a quality of the quadrature signals from said digital root nyquist filter is less than a reference.

5. A data receiving apparatus as claimed in claim 1, wherein said coefficient prediction circuit comprises a real number type Finite Impulse Response filter for effecting real-number-type-Finite-Impulse-Response-filtering to the quadrature signals from said digital root nyquist filter, first and second means for obtaining differences between filtered quadrature signals from said real number type Finite Impulse Response filter and reference quadrature signals, said real number type Finite Impulse Response filter predicting said coefficient such that said differences become small.

6. A data receiving apparatus as claimed in claim 1, wherein said coefficient prediction circuit comprises a complex number type Finite Impulse Response filter for effecting complex-number-type-Finite-Impulse-Response filtering to the quadrature signals from said digital root nyquist filter and generating a complex signal, means for obtaining a difference between an output of said complex number type Finite Impulse Response filter and a reference complex signal, said complex number type of Finite Impulse Response filter predicting said coefficient such that said differences become small.

7. A data receiving apparatus as claimed in claim 1, wherein said quadrature signals in said radio wave signal includes a predetermined data pattern and said coefficient prediction means predicts said coefficient from said predetermined data pattern.

8. A data receiving apparatus as claimed in claim 2, wherein said memory comprises an EEPROM.

9. A data receiving apparatus as claimed in claim 1, wherein said bandpass filter has a first characteristic, said digital root nyquist filter has a second characteristic determined by said coefficient, and said prediction means predicts said coefficient such that said first and second characteristics satisfy a root nyquist characteristic.

10. A data receiving apparatus comprising:

receiving means for receiving an intermediate frequency signal including a channel of quadrature signals;

bandpass filter means for extracting said channel of quadrature components from said intermediate frequency signal;

quadrature detection means for effecting a quadrature detection to said intermediate frequency signal from said bandpass filter means and generating quadrature signals;

a digital root nyquist filter for effecting digital-root-nyquist-filtering to said quadrature signals from said quadrature detection means with a coefficient; and coefficient prediction means responsive to the quadrature signals from said digital root nyquist filter for predicting said coefficient and supplying said coefficient to said digital root nyquist filter.

* * * * *